United States Patent
Shimizu et al.

(10) Patent No.: US 10,109,199 B2
(45) Date of Patent: Oct. 23, 2018

(54) PREVENTION SAFETY DEVICE IN COURSE CHANGE OF SMALL-SIZED VEHICLE

(71) Applicant: SUZUKI MOTOR CORPORATION, Hamamatsu-Shi, Shizuoka (JP)

(72) Inventors: Takashi Shimizu, Hamamatsu (JP); Koji Kurata, Hamamatsu (JP)

(73) Assignee: Suzuki Motor Corporation, Hamamatsu-Shi, Shizuoka (JP)

( * ) Notice: Subject to any disclaimer, the term of this patent is extended or adjusted under 35 U.S.C. 154(b) by 24 days.

(21) Appl. No.: 15/402,308

(22) Filed: Jan. 10, 2017

(65) Prior Publication Data
US 2017/0206789 A1    Jul. 20, 2017

(30) Foreign Application Priority Data

Jan. 15, 2016 (JP) ................ 2016-005830

(51) Int. Cl.
| | | |
|---|---|---|
| G08G 1/16 | (2006.01) | |
| G05D 1/00 | (2006.01) | |
| B60W 30/00 | (2006.01) | |
| B60W 30/08 | (2012.01) | |
| G05D 1/02 | (2006.01) | |

(52) U.S. Cl.
CPC ............. G08G 1/166 (2013.01); B60W 30/08 (2013.01); G05D 1/0088 (2013.01); G05D 1/0231 (2013.01); G05D 1/0257 (2013.01); G05D 1/0289 (2013.01); *B60W 2420/52* (2013.01); *B60W 2550/10* (2013.01); *B60W 2750/306* (2013.01); *B60W 2750/40* (2013.01); *G05D 2201/0213* (2013.01)

(58) Field of Classification Search
CPC ......... G08G 1/16; G08G 1/166; B60W 30/00; B60W 30/08; G05D 1/00; G05D 1/0088; G05D 1/0231; G05D 1/0257; G05D 1/0289
See application file for complete search history.

(56) References Cited

U.S. PATENT DOCUMENTS

| | | |
|---|---|---|
| 2008/0189040 A1 | 8/2008 | Nasu et al. |
| 2010/0021011 A1* | 1/2010 | Shida .................. B60R 1/00 382/104 |

(Continued)

FOREIGN PATENT DOCUMENTS

| | | |
|---|---|---|
| JP | 2008191781 A | 8/2008 |
| JP | 2012051503 A | 3/2012 |
| JP | 2015102932 A | 6/2015 |

*Primary Examiner* — Yonel Beaulieu
(74) *Attorney, Agent, or Firm* — Troutman Sanders LLP (57) ABSTRACT

A prevention safety device in course change of small-sized vehicle includes a rear vehicle detector, a detection state determining unit, and a vehicle's own information transmitting unit. The rear vehicle detector is configured to detect a rear vehicle travelling at a rear of one's own vehicle. The detection state determining unit is configured to determine whether the rear vehicle detects one's own vehicle or not when the rear vehicle detected by the rear vehicle detector is an autonomous vehicle. The vehicle's own information transmitting unit is configured to transmit vehicle's own information to the rear vehicle immediately before one's own vehicle changes a course when the detection state determining unit determines that the rear vehicle does not detect one's own vehicle.

14 Claims, 6 Drawing Sheets

(56) References Cited

U.S. PATENT DOCUMENTS

| | | | |
|---|---|---|---|
| 2012/0062743 A1* | 3/2012 | Lynam | B60Q 9/005 348/148 |
| 2013/0151058 A1* | 6/2013 | Zagorski | B60W 30/09 701/23 |
| 2014/0071278 A1* | 3/2014 | Assaf | B60R 1/12 348/148 |
| 2015/0165971 A1* | 6/2015 | Grundmann | B60Q 9/008 348/148 |
| 2015/0264321 A1* | 9/2015 | Dellantoni | G01C 21/3602 348/148 |
| 2015/0360697 A1* | 12/2015 | Baek | B60W 40/09 701/23 |
| 2016/0042238 A1* | 2/2016 | Lynam | B60Q 9/005 701/45 |
| 2017/0011633 A1* | 1/2017 | Boegel | G05D 1/0293 |
| 2017/0193384 A1* | 7/2017 | Mudalige | G06N 7/005 |

* cited by examiner

PREVENTION SAFETY DEVICE IN COURSE CHANGE OF SMALL-SIZED VEHICLE

CROSS-REFERENCE TO RELATED APPLICATIONS

This application is based upon and claims the benefit of priority of the prior Japanese Patent Application No. 2016-005830, filed on Jan. 15, 2016, the entire contents of which are incorporated herein by reference.

BACKGROUND OF THE INVENTION

Field of the Invention

The present invention relates to a prevention safety device in course change of small-sized vehicle.

Description of the Related Art

Recently, there has been developed a device and a system that detect obstacles such as automobiles and bikes around one's own vehicle and automatically avoid a collision of one's own vehicle with the obstacles to reduce a load of a driver.

Patent Document 1 discloses a driving assistance device that performs any one of a first driving assistance and a second driving assistance. The first driving assistance is based on a degree of approach of one's own vehicle to a moving body in the case where one's own vehicle continues a current moving state. The second driving assistance is based on the degree of approach of one's own vehicle to the moving body in a virtual state where one's own vehicle changes the current moving state.

Patent Document 2 discloses a vehicle control system that, when detecting an object present at a merging lane, the vehicle control system determines this object as a control target and controls a behavior according to a distance relative to the control target.

Patent Document 3 discloses a collision avoidance system that estimates an action range of an obstacle and creates vehicle motion control information required for one's own vehicle to travel a locus where an entrance of one's own vehicle to the estimated action range can be avoided to assist an operation.

Patent Document 1: Japanese Laid-open Patent Publication No. 2015-102932

Patent Document 2: Japanese Laid-open Patent Publication No. 2012-51503

Patent Document 3: Japanese Laid-open Patent Publication No. 2008-191781

The devices and systems disclosed in the above-described Patent Documents detect a forward vehicle via a camera and a radar device. However, in the case where the forward vehicle or the second vehicle ahead is a small-sized vehicle such as a motorcycle, it is assumed that an autonomous vehicle cannot detect the forward vehicle in some cases. Alternatively, in the case where a plurality of small-sized vehicles travel (run side by side) forward adjacent to one's own vehicle, the autonomous vehicle possibly incorrectly detects the state and detects none of the small-sized vehicles. Even in this case, whether the autonomous vehicle detects the small-sized vehicles travelling forward or not cannot be identified from outside.

Meanwhile, it is estimated that the autonomous vehicles will increase from now on in highways. A sudden braking and a sharp turn of a steering wheel in high speed travelling on the highways possibly causes a secondary disaster; therefore, it is difficult for even the autonomous vehicle to perform an urgent evasive action.

In such situation, it is considered that the small-sized vehicle travelling in front of the autonomous vehicle needs to include a prevention safety device for safety travelling. However, conventionally, the prevention safety device appropriate for the small-sized vehicles was not developed.

SUMMARY OF THE INVENTION

The present invention has been made to solve the above-described problems. An object of the present invention is to provide a prevention safety device in course change of small-sized vehicle that can reduce a risk possibly occurring in a small-sized vehicle that travels in front of an autonomous vehicle.

The present invention is a prevention safety device in course change of small-sized vehicle that includes a rear vehicle detection unit, a determining unit, and a transmitting unit. The rear vehicle detection unit is configured to detect a rear vehicle travelling at a rear of one's own vehicle. The determining unit is configured to determine whether the rear vehicle detects one's own vehicle or not when the rear vehicle detected by the rear vehicle detection unit is an autonomous vehicle. The transmitting unit is configured to transmit vehicle's own information to the rear vehicle immediately before one's own vehicle changes a course when the determining unit determines that the rear vehicle does not detect one's own vehicle.

The present invention is a prevention safety device in course change of small-sized vehicle that includes a rear vehicle detection unit, a determining unit, and a transmitting unit. The rear vehicle detection unit is configured to detect a rear vehicle travelling at a rear of one's own vehicle. The determining unit is configured to determine whether a first rear vehicle detects one's own vehicle or not when the first rear vehicle detected by the rear vehicle detection unit is an autonomous vehicle. The transmitting unit is configured to transmit the vehicle's own information to a second rear vehicle immediately before one's own vehicle changes a course when the determining unit determines that the first rear vehicle detects one's own vehicle and the second rear vehicle detected by the rear vehicle detection unit is the autonomous vehicle.

DETAILED DESCRIPTION OF THE PREFERRED EMBODIMENTS

The following describes preferred embodiments of a prevention safety device in course change of small-sized vehicle according to the present invention with reference to the drawings. The following describes the case where the small-sized vehicle is a motorcycle or an open-sports, small-sized, four-wheeled vehicle with low vehicle height (hereinafter referred to as a light automobile).

Figure 1A:
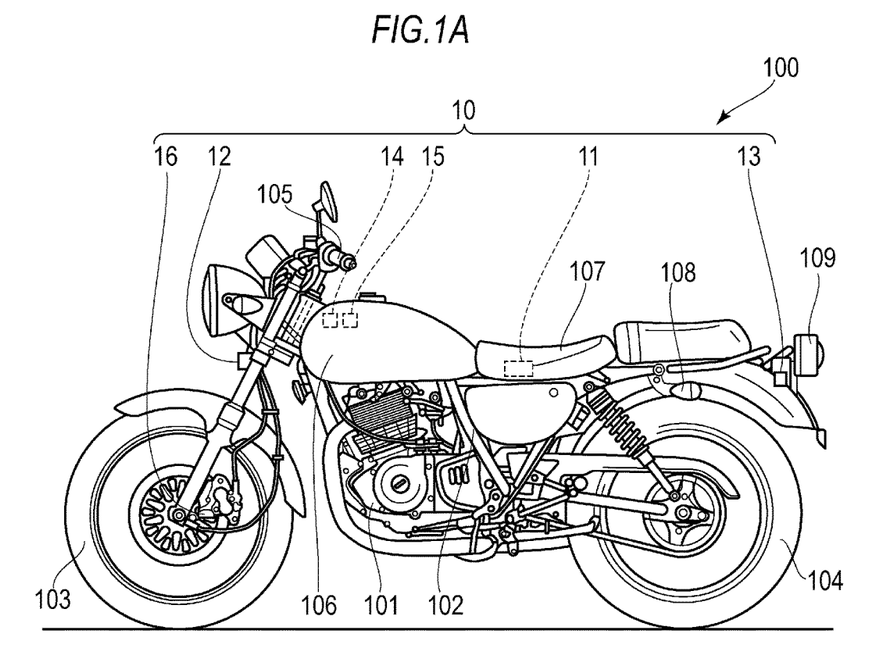
FIGS. 1A and 1B are drawings illustrating examples of configurations of small-sized vehicles that include a prevention safety device.

FIG. 1A is a drawing illustrating a configuration of the motorcycle that includes a prevention safety device according to this embodiment.

A motorcycle 100 includes an engine 101, a frame 102, a front wheel 103, a rear wheel 104, a handlebar 105, a fuel tank 106, a seat 107, a turn-signal lamp 108, a brake lamp 109, and a similar member. A turn-signal lamp SW (switch) is mounted to the handlebar 105.

The motorcycle 100 includes a prevention safety device 10. Specifically, the prevention safety device 10 includes an ECU 11 as a control device, a camera 12 as a lane detection device, a milliwave radar 13 as a rear vehicle detection device, a vehicle-to-vehicle communication device 14 as a communication device, a GPS (Global Positioning System) receiver 15, and a vehicle speed sensor 16 as a vehicle speed detection device.

The ECU 11 is an electronic control unit functioning as a computer to control various configuration devices disposed at, for example, downward the seat 107. The ECU 11 includes a CPU, a memory, an input interface, an output interface, and a similar member. With the ECU 11, the CPU executes programs stored in the memory to transmit vehicle information regarding one's own vehicle (hereinafter referred to as vehicle's own information) to an autonomous vehicle on the basis of information output from various sensors or a similar member to reduce a risk possibly occurring in one's own vehicle. The ECU 11 stores thresholds and similar values used for some determinations until the vehicle's own information is transmitted in the memory.

The camera 12 photographs lateral sides of the motorcycle 100, that is, a right side and a left side with respect to a traveling direction. The camera 12 is disposed, for example, close to the front wheel 103 such that an occupant does not cover a lens. Image information photographed by the camera 12 is transmitted to the ECU 11. The camera 12 is not limited to one but may be disposed one or more at each of the right side and the left side. The camera 12 does not necessarily photograph the lateral sides but may photograph a front side or a rear side.

The milliwave radar 13 mainly detects a rear vehicle or a vehicle located obliquely rearward. The milliwave radar 13 is disposed, for example, near the brake lamp 109 so as to ensure transmitting radio waves to the rear of the motorcycle 100. Reflection information of the radio waves transmitted by the milliwave radar 13 and reflected by the rear vehicle is transmitted to the ECU 11. A detection range by the milliwave radar 13 is about 120 m under good detection environment conditions. Even if the detection environment conditions are poor due to rain, a fog, and a similar factor, the milliwave radar 13 is less susceptible compared with another detection unit. Meanwhile, the minimum speed is 50 km/h at roads where high speed travelling is allowed (for example, Japanese national expressways), and a stop distance at braking at this time is approximately 32 m. With the speed of 60 km/h, the stop distance is approximately 44 m. With the speed of 70 km/h, the stop distance is approximately 58 m. In this manner, assuming the inter-vehicular distance accommodating the detection environment conditions and the stop distance at braking during high speed travelling, the rear vehicles up to the first vehicle and the second vehicle can be assumed as the detection range.

Figure 2A:
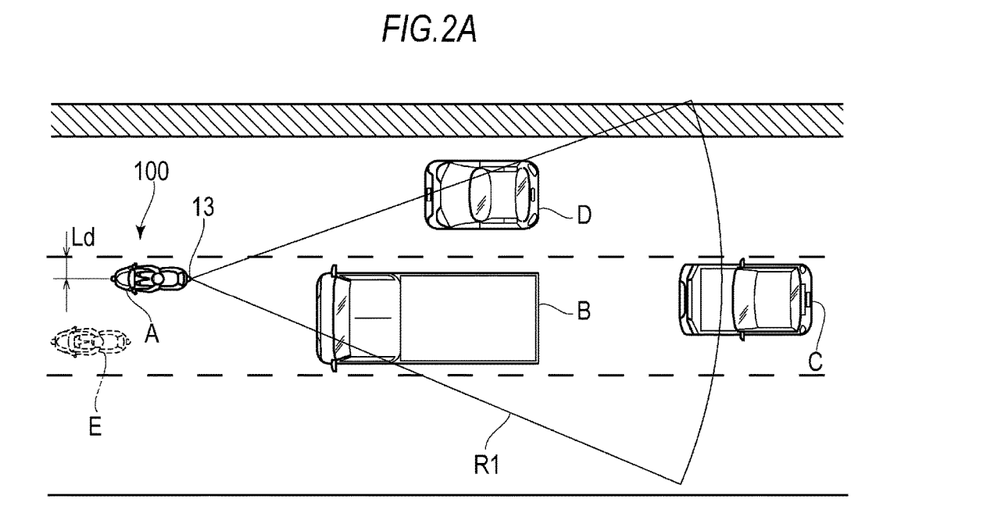
FIGS. 2A and 2B are drawings illustrating examples of detection ranges of a rear vehicle detection device.

FIG. 2A is a drawing illustrating an example of the detection range of the rear vehicles by the milliwave radar 13. The motorcycle 100 is one's own vehicle A, and a first rear vehicle B and then a second rear vehicle C travel at the rear of the one's own vehicle A. Lanes for course change are provided to the right and left of a driving lane on which the one's own vehicle A travels. A rear vehicle D travels the right lane for course change.

A detection range R1 by the milliwave radar 13 illustrated in FIG. 2A can detect the first rear vehicle B and the second rear vehicle C. Further, since the detection range R1 is radially formed, the detection range R1 can also detect the rear vehicle D, which is located obliquely rearward.

Next, the vehicle-to-vehicle communication device 14 communicates with a vehicle-to-vehicle communication device mounted to a vehicle other than one's own vehicle. The vehicle-to-vehicle communication device 14 is disposed, for example, at a peripheral area of the fuel tank 106. However, as long as being disposed at a position where good communications can be established, the vehicle-to-vehicle communication device 14 may be disposed at any position. The vehicle-to-vehicle communication device 14 includes a receiving unit, which receives the vehicle information from another autonomous vehicle, and a transmitting unit, which transmits the vehicle's own information. The vehicle information received by the receiving unit is transmitted to the ECU 11. Meanwhile, the vehicle's own information, which is created by the ECU 11, is transmitted via the transmitting unit. The vehicle information includes identification information on the vehicle, location information of the vehicle, driving information of the vehicle, and similar information. The identification information is an ID unique to the vehicle. The location information is a coordinate indicative of a current position of the vehicle. The driving information is information indicative of a driving state of this vehicle.

The communication device may not include the receiving unit but include only the transmitting unit. In this case, the communication device can transmit only the vehicle's own information without receiving the vehicle information from the autonomous vehicle.

The GPS receiver 15 receives the radio waves transmitted from a plurality of artificial satellites. The GPS receiver 15 is, for example, disposed at the peripheral area of the fuel tank 106. However, as long as being disposed at a position where the radio waves can be properly received from the artificial satellites, the GPS receiver 15 may be disposed at any position. Radio wave information received by the GPS receiver 15 is transmitted to the ECU 11.

The vehicle speed sensor 16 detects a vehicle speed of the motorcycle 100. The vehicle speed sensor 16 is, for example, disposed near the front wheel 103. Vehicle speed information detected by the vehicle speed sensor 16 is transmitted to the ECU 11.

Figure 1B:
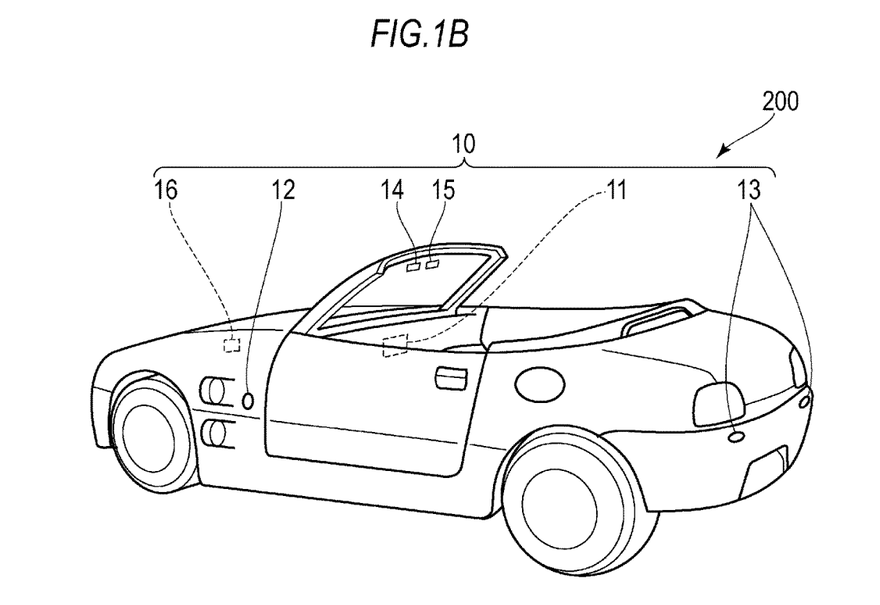

Although the case where the small-sized vehicle is the motorcycle is described above, this should not be constructed in a limiting sense. The small-sized vehicle may be a light automobile. FIG. 1B is a drawing illustrating a configuration of a light automobile (Japanese category of small vehicles) 200 that includes the prevention safety device 10 according to the embodiment. The light automobile 200 has a configuration similar to the prevention safety device 10 of the above-described motorcycle 100. However, since a frame structure and a similar structure largely differ, the position where the prevention safety device 10 is disposed differs. Like reference numerals designate corresponding or identical elements of the prevention safety device 10, and therefore such elements will not be further elaborated here.

The milliwave radars 13 illustrated in FIG. 1B are positioned away from one another, a right and a left on a rear bumper, and are disposed by two downward of respective brake lamps.

Figure 2B:
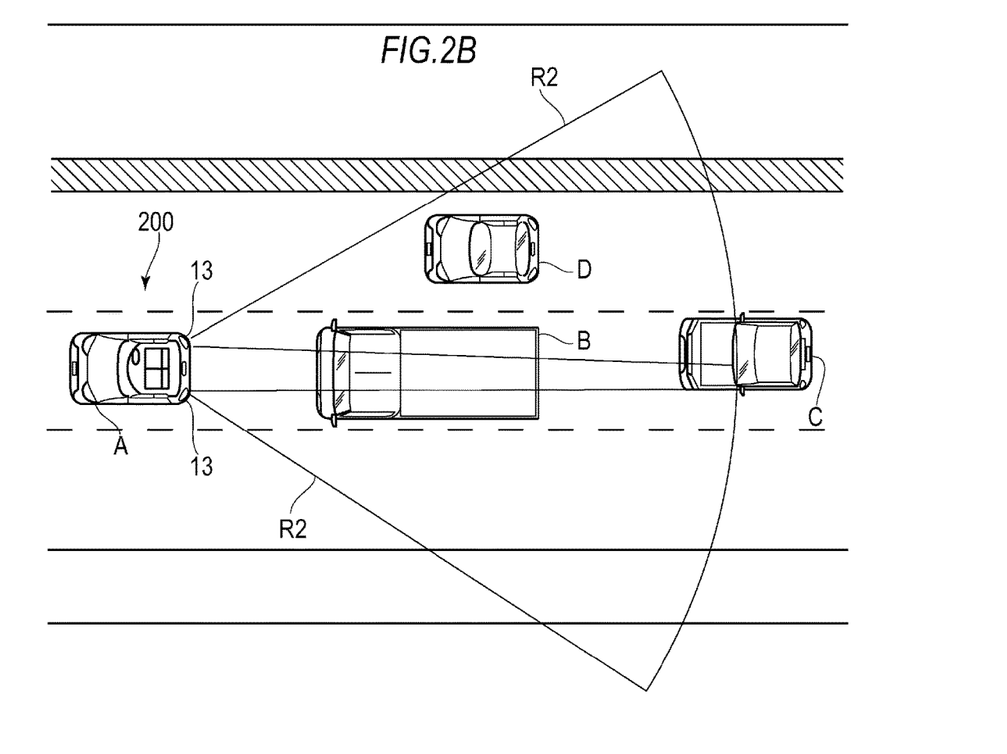

FIG. 2B is a drawing illustrating an example of the detection ranges of the rear vehicles by the two milliwave radars 13. The light automobile 200 is the one's own vehicle A. Detection ranges R2 by the two milliwave radars 13 illustrated in FIG. 2B can detect the first rear vehicle B and the second rear vehicle C. Further, since the detection ranges R2 are each radially formed, the detection ranges R2 can also detect the rear vehicle D, which is located obliquely rearward.

Figure 3:
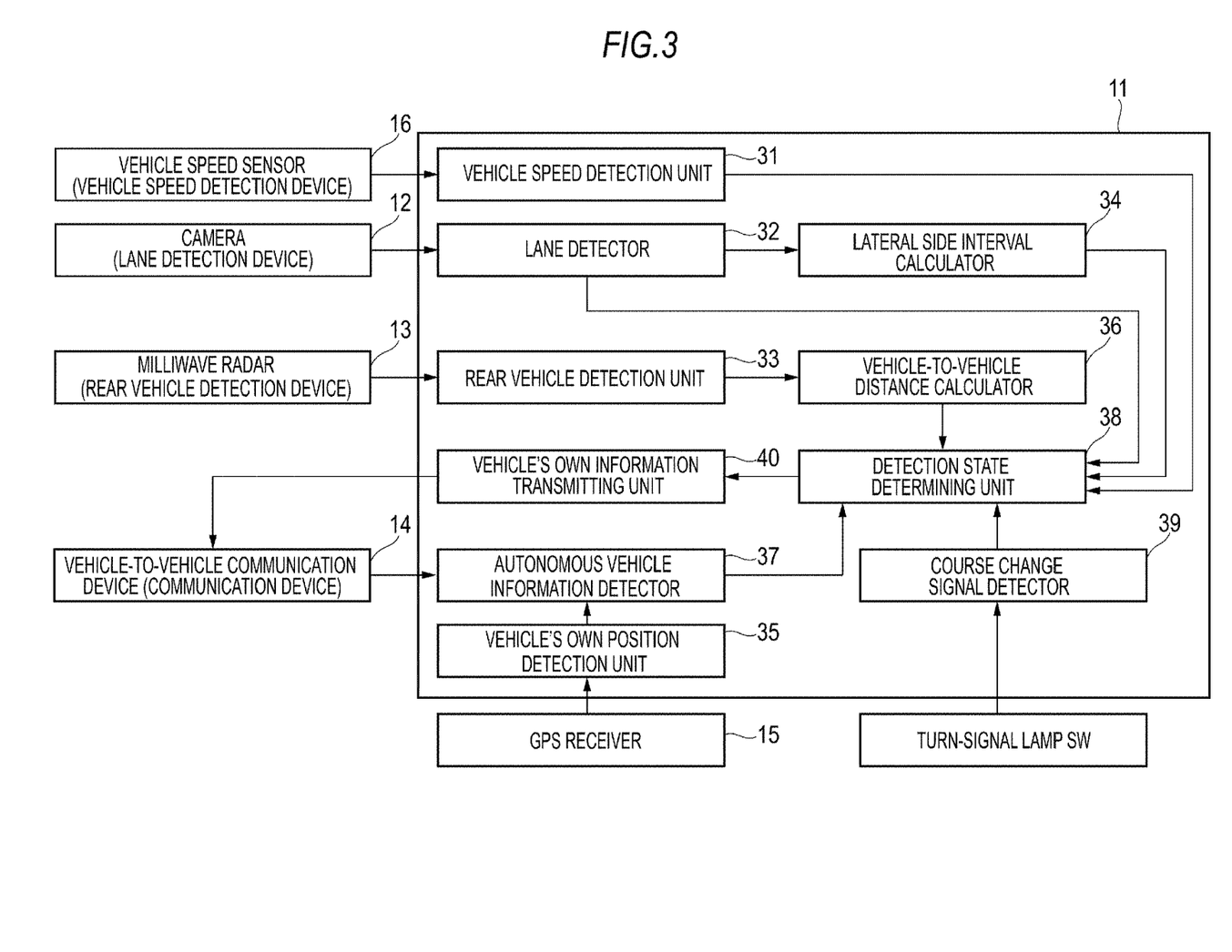
FIG. 3 is a drawing illustrating an example of a functional configuration of the prevention safety device.

The following describes a functional configuration of the ECU 11 in the prevention safety device 10 with reference to FIG. 3. The functional configuration of the ECU 11 illustrated in FIG. 3 is constituted by the execution of the programs stored in the memory by the CPU.

Specifically, the ECU 11 includes a vehicle speed detector 31, a lane detector 32, a rear vehicle detector 33, a lateral side interval calculator 34, a vehicle's own position detector 35, a vehicle-to-vehicle distance calculator 36, an autonomous vehicle information detector 37, a detection state determining unit 38, a course change signal detector 39, a vehicle's own information transmitting unit 40, and a similar member.

The vehicle speed detector 31 obtains the vehicle speed information from the vehicle speed sensor 16 and detects the vehicle speed of one's own vehicle on the basis of the obtained information.

The lane detector 32 obtains the image information from the camera 12 and detects any one of the lanes at the right and the left of the driving lane on which one's own vehicle travels on the basis of the obtained information.

The rear vehicle detector 33 obtains the reflection information from the milliwave radar 13 and detects the rear vehicles on the basis of the obtained information. The rear vehicle detector 33 corresponds to an example of a rear vehicle detection unit.

The lateral side interval calculator 34 obtains the image information from the camera 12 via the lane detector 32 and calculates an interval between one's own vehicle and the lane for course change on the basis of the obtained information.

The vehicle's own position detector 35 obtains the radio wave information from the artificial satellites from the GPS receiver 15 and detects the location information and the travelling direction of one's own vehicle on the basis of the obtained radio wave information.

The vehicle-to-vehicle distance calculator 36 obtains the reflection information from the milliwave radar 13 via the rear vehicle detector 33 and calculates the vehicle-to-vehicle distance with the (first) rear vehicle or the vehicle-to-vehicle distance between the first rear vehicle and a second rear vehicle on the basis of the obtained information.

The autonomous vehicle information detector 37 obtains the vehicle information on the autonomous vehicle from the vehicle-to-vehicle communication device 14 and detects the vehicle information on the autonomous vehicle that travels around one's own vehicle.

With the rear vehicle being the autonomous vehicle, the detection state determining unit 38 determines whether the rear vehicle has detected one's own vehicle or not. The detection state determining unit 38 corresponds to an example of a determining unit.

The course change signal detector 39 detects that the turn-signal lamp SW is on.

The vehicle's own information transmitting unit 40 creates the vehicle's own information and transmits the created vehicle's own information to the rear vehicle via the vehicle-to-vehicle communication device 14. The vehicle's own information transmitting unit 40 corresponds to an example of a transmitting unit.

The following describes a control performed by the prevention safety device 10 according to the embodiment.

Although an automatic vehicle-control system is an extremely highly-reliable system, with one's own vehicle being the small-sized vehicle, the autonomous vehicle that travels at the rear of one's own vehicle possibly incorrectly detects the state. For example, as illustrated in FIG. 2A, in the case where one's own vehicle A and a small-sized vehicle E adjacently run side by side, the autonomous vehicle, the rear vehicle B or the rear vehicle C, incorrectly recognizes that the communications are in progress with the small-sized vehicle E, causing a possibility of undetected one's own vehicle A. In such case, it is considered that the autonomous vehicle determines that one's own vehicle A is absent and performs an automatic driving.

Usually, the autonomous vehicle detects the nearby vehicles by the radar and the camera and travels using this information. However, it is considered that, under the poor detection environment conditions (such as bad weather), the autonomous vehicle possibly determines that one's own vehicle A is absent and performs the automatic driving.

Assuming the case where the autonomous vehicle does not detect one's own vehicle A, this embodiment actively takes preventive safety on the small-sized vehicle as measures for self-defense. Especially, in the case where one's own vehicle A changes the course during high speed travelling, considering the situation that it is difficult for an occupant of one's own vehicle A to immediately take an action to avoid a danger, the prevention safety device 10 according to the embodiment specializes in a control during the course change.

The case where one's own vehicle changes the course assumes the case where, for example, a vehicle merges from any one of the right and the left and one's own vehicle gives the lane, a vehicle travels at low speed in front of one's own vehicle and one's own vehicle overtakes the low-speed vehicle, or an obstacle is present in front of one's own vehicle and therefore there is no choice but to change the course.

The prevention safety device 10 according to the embodiment features the following processes.

First, when the small-sized vehicle as one's own vehicle changes the course, the prevention safety device 10 first detects the rear vehicle travelling at the rear of one's own vehicle. With the detected rear vehicle being the autonomous vehicle, the prevention safety device 10 determines whether the rear vehicle has detected one's own vehicle or not. When determining that the rear vehicle does not detect one's own vehicle, the prevention safety device 10 performs a control to transmit the vehicle's own information to the rear vehicle immediately before one's own vehicle changes the course.

Secondly, in the case where the small-sized vehicle as one's own vehicle changes the course, the prevention safety device 10 detects the rear vehicle travelling at the rear of one's own vehicle. With the detected first rear vehicle being the autonomous vehicle, the prevention safety device 10 determines whether the first rear vehicle has detected one's own vehicle or not. In the case where the first rear vehicle has detected one's own vehicle and the second rear vehicle is the autonomous vehicle, the prevention safety device 10 performs the control to transmit the vehicle's own information to the second rear vehicle immediately before one's own vehicle changes the course.

Figure 4:
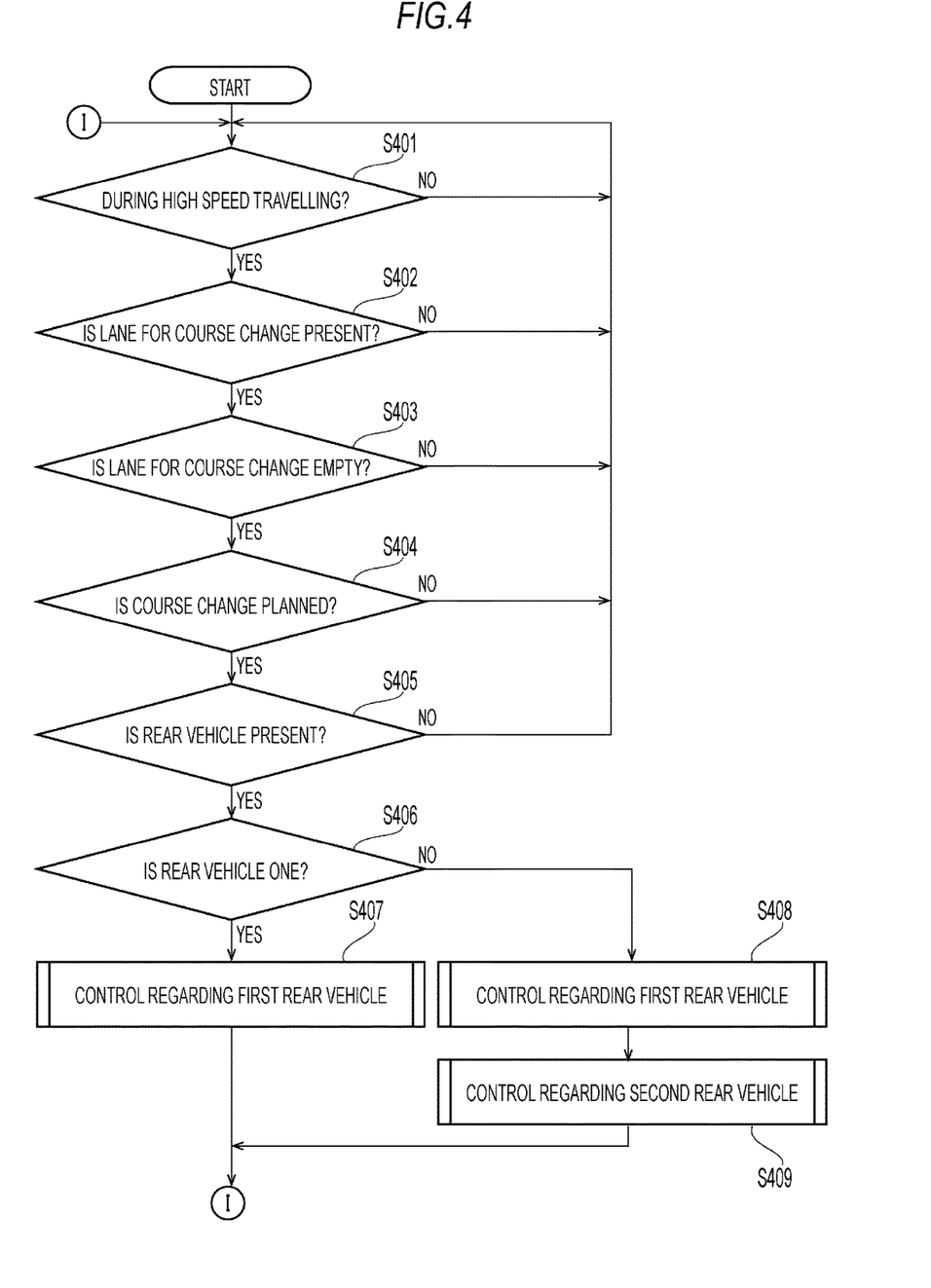
FIG. 4 is a flowchart illustrating processes of the prevention safety device.
Figure 5:
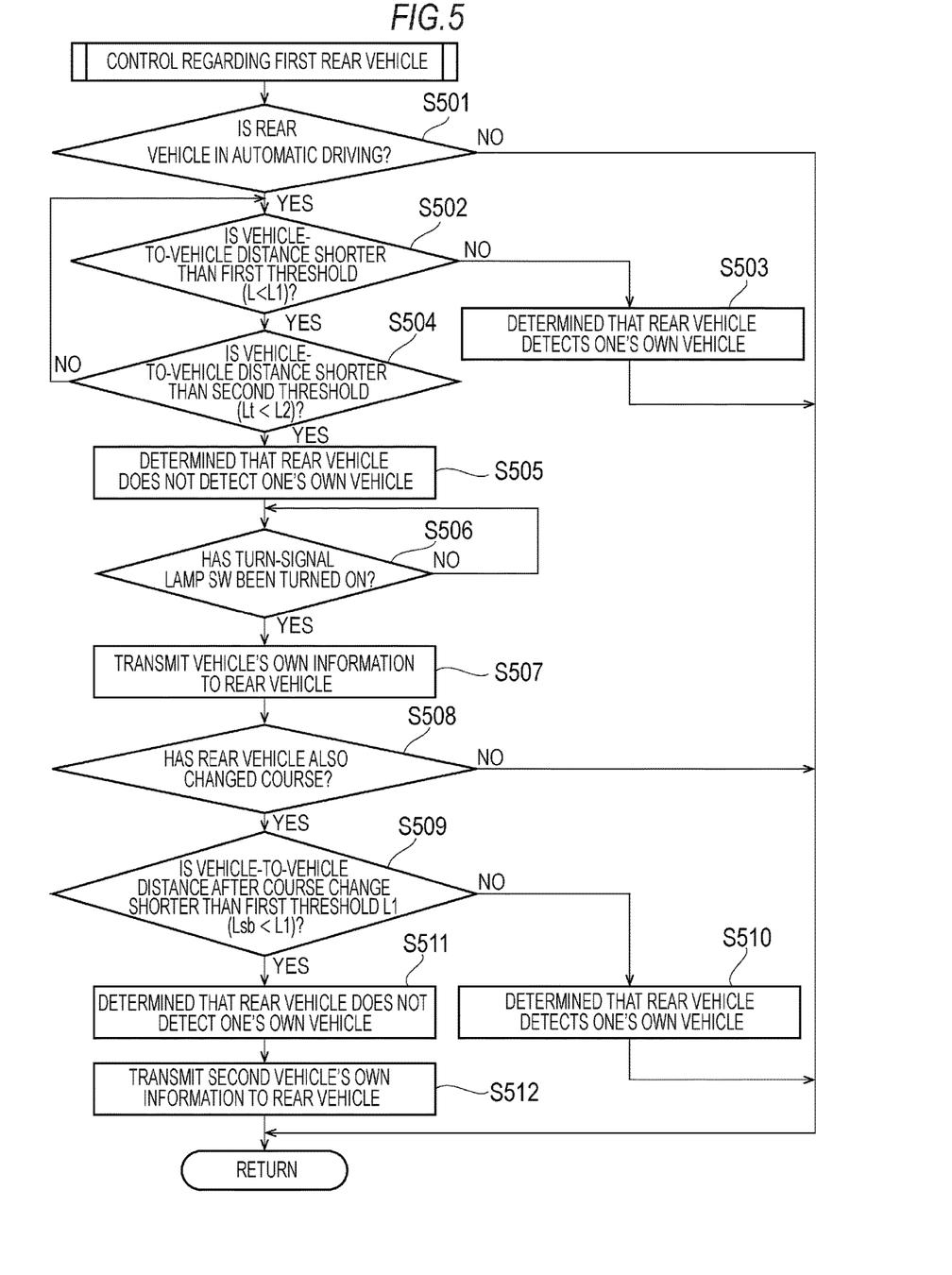
FIG. 5 is a flowchart illustrating a control regarding a first rear vehicle.
Figure 6:
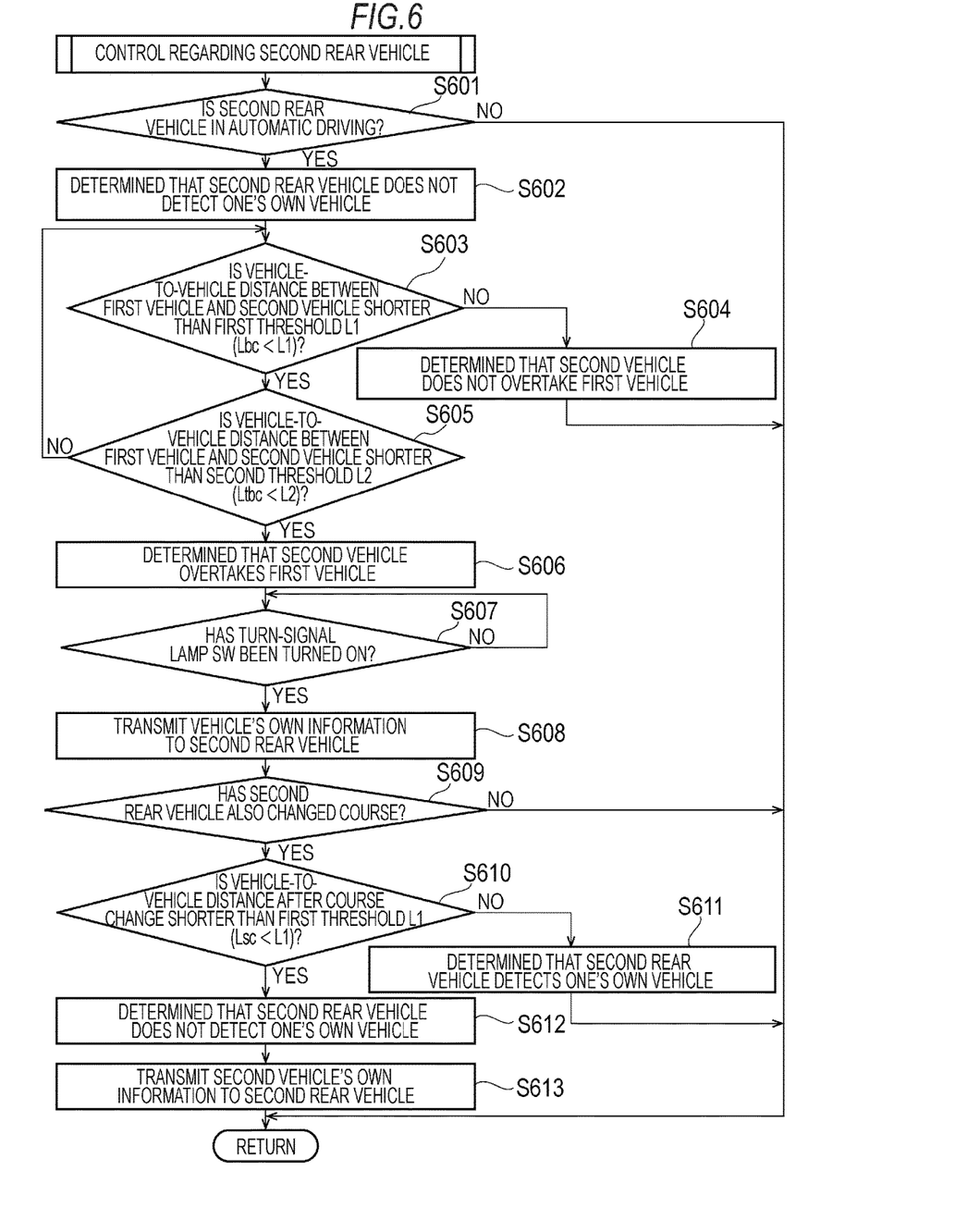
FIG. 6 is a flowchart illustrating a control regarding a second rear vehicle.

The following describes specific processes by the prevention safety device 10 according to the embodiment with reference to the flowcharts illustrated in FIG. 4 to FIG. 6. The execution of the programs stored in the memory by the CPU in the ECU 11 achieves the flowcharts illustrated in FIG. 4 to FIG. 6. The ECU 11 constantly obtains the information from the camera 12, the milliwave radar 13, the vehicle-to-vehicle communication device 14, the GPS receiver 15, and the vehicle speed sensor 16.

First, at S401, the ECU 11 determines whether one's own vehicle is during the high speed travelling or not. Specifically, the vehicle speed detector 31 obtains the vehicle speed information from the vehicle speed sensor 16 and determines whether the vehicle speed is equal to or more than a predetermined threshold or not on the basis of the obtained information. For example, 80 km/h is applicable as the predetermined threshold, with the vehicle speed of 80 km/h or more, the ECU 11 determines that one's own vehicle is during the high speed travelling. In the case of the high speed travelling, the process proceeds to S402. When one's own vehicle is not in the high speed travelling, the ECU 11 stands by until one's own vehicle enters the high speed travelling. Whether the travelling road is an ordinary road or the highway is not limited.

At S402, the ECU 11 determines whether the lane for course change is present or not. Specifically, the lane detector 32 obtains the image information from the camera 12 and the ECU 11 determines whether the lane is present at any one of the right and the left of the driving lane on which one's own vehicle travels or not on the basis of the obtained information. When the lane is present at any one of the right and the left, the ECU 11 determines that the lane for course change is present. With the lane for course change present, the process proceeds to S403. With the lane for course change absent, the process returns to S401.

At S403, the ECU 11 determines whether the lane for course change is empty or not. Specifically, the rear vehicle detector 33 obtains the reflection information from the milliwave radar 13. The ECU 11 determines whether the rear vehicle approaching from the rear on the lane for course change is present or not on the basis of the obtained information. In the case where the rear vehicle approaching from the rear on the lane for course change is absent, the ECU 11 determines that the lane for course change is empty. When the lane for course change is empty, the process proceeds to S404. When the lane for course change is not empty, the process returns to S401.

At S404, the ECU 11 determines whether the course change is planned or not. Specifically, the lateral side interval calculator 34 obtains the image information from the camera 12 via the lane detector 32. The ECU 11 calculates the interval between one's own vehicle and the lane for course change on the basis of the obtained information and compares the interval with a predetermined threshold. FIG. 2A indicates the interval between one's own vehicle and the lane for course change by Ld. With the interval equal to or less than the predetermined threshold, the ECU 11 determines that the course change is planned. When the course change is planned, the process proceeds to S405. When the course change is not planned, the process returns to S401.

At S405, the ECU 11 determines whether the rear vehicle is present or not at the rear on the driving lane on which one's own vehicle travels. Specifically, the rear vehicle detector 33 obtains the reflection information from the milliwave radar 13 and determines whether the rear vehicle is present or not at the rear on the driving lane on the basis of the obtained information. With the rear vehicle being present, the process proceeds to S406. With the vehicle being absent, the process returns to S401.

At S406, the ECU 11 determines whether the rear vehicle is one or not. Specifically, the rear vehicle detector 33 obtains the reflection information from the milliwave radar 13 and determines the number of rear vehicles on the driving lane on the basis of the obtained information. When the rear vehicle is one, the process proceeds to S407. Meanwhile, when the rear vehicle is not one, that is, the two rear vehicles in this embodiment, the process proceeds to S408. At S406, since one's own vehicle approaches the lane for course change, the radio waves from the milliwave radar 13 pass through between the driving lane and the lane for course change and are transmitted to the rear vehicles after the first vehicle. Accordingly, the rear vehicle detector 33 can also detect the second rear vehicle.

The following gives a description with reference to the flowchart in FIG. 5. The flowchart in FIG. 5 illustrates a control regarding this rear vehicle in the case where the rear vehicle is one (S407). Alternatively, the flowchart illustrates a control regarding the first rear vehicle in the case where the rear vehicles are two (S408).

At S501, the ECU 11 determines whether the rear vehicle is in the automatic driving or not. The following describes an example of a method for determining the autonomous vehicle.

First, the vehicle's own position detector 35 obtains the radio wave information from the artificial satellites from the GPS receiver 15 and detects the location information and the travelling direction of one's own vehicle on the basis of the obtained radio wave information. The vehicle-to-vehicle distance calculator 36 obtains the reflection information from the milliwave radar 13 via the rear vehicle detector 33 and calculates the vehicle-to-vehicle distance with the (first) rear vehicle on the basis of the obtained information. Next, the autonomous vehicle information detector 37 identifies the vehicle information containing the location information indicative of being away from the position of one's own vehicle by the vehicle-to-vehicle distance calculated by the vehicle-to-vehicle distance calculator 36 as the vehicle information received from the rear vehicle among the vehicle information received via the vehicle-to-vehicle communication device 14 from the plurality of vehicles travelling around one's own vehicle. In the case where the driving information contained in the identified vehicle information contains information indicative of the automatic driving, the autonomous vehicle information detector 37 determines that the rear vehicle is in the automatic driving. Meanwhile, in the case where the driving information contains information indicative of a manual driving (information indicative of not the automatic driving), the autonomous vehicle information detector 37 determines that the rear vehicle is not in the automatic driving. In the case where none of the vehicle information contains the location information that the rear vehicle is away from the position of one's own vehicle by the vehicle-to-vehicle distance calculated by the vehicle-to-vehicle distance calculator 36 among the vehicle information received from the plurality of vehicles, the autonomous vehicle information detector 37 determines that the rear vehicle is in the manual driving and therefore is not in the automatic driving. In the automatic driving, the process proceeds to S502. In the case of not in the automatic driving, it is considered that a driver visually checks one's own vehicle, the process returns to the flowchart in FIG. 4. With the case of the rear vehicle being two, to perform the control regarding the second rear vehicle, the process proceeds to S409 (the flowchart in FIG. 6).

The method for determining whether the rear vehicle is in the automatic driving or not can be a method other than the above-described method. For example, it is assumed that, to notify other vehicles of one's own vehicle being in the automatic driving, the autonomous vehicle lights on a position lamp for automatic driving mode during the automatic driving and in the manual driving, the autonomous vehicle lights off the position lamp for automatic driving mode. Accordingly, with the motorcycle 100 further including the camera to photograph the rear, when the position lamp for automatic driving mode of the rear vehicle lights on the basis of the image information from the camera, the autonomous vehicle information detector 37 can determine that the rear vehicle is in the automatic driving.

Next, at S502, the ECU 11 determines whether the vehicle-to-vehicle distance with the rear vehicle is the predetermined distance, here, shorter than a first threshold L1 or not. Specifically, the vehicle-to-vehicle distance calculator 36 again obtains the reflection information from the milliwave radar 13 via the rear vehicle detector 33, calculates a vehicle-to-vehicle distance L with the rear vehicle on the basis of the obtained information, and compares the vehicle-to-vehicle distance L with the first threshold L1. With the vehicle-to-vehicle distance L equal to or more than the first threshold L1, the process proceeds to S503. With the vehicle-to-vehicle distance L shorter than the first threshold L1, since a possibility that the rear vehicle does not detect one's own vehicle is high, the process proceeds to S504. The vehicle-to-vehicle distance calculator 36 sets the first threshold L1 on the basis of a proper braking distance relative to the vehicle speed. That is, a table stores the first threshold L1 according to the vehicle speed such that the first threshold L1 increases with the large vehicle speed.

At S503, the ECU 11, here the detection state determining unit 38 determines that the rear vehicle detects one's own vehicle and returns the process to the flowchart in FIG. 4. With the two rear vehicles, to perform the control regarding the second rear vehicle, the process proceeds to S409 (the flowchart in FIG. 6).

At S504, the ECU 11 determines whether the vehicle-to-vehicle distance with the rear vehicle is the predetermined distance, here, shorter than a second threshold L2 or not. Specifically, the vehicle-to-vehicle distance calculator 36 again obtains the reflection information from the milliwave radar 13 via the rear vehicle detector 33 after an elapse of the predetermined time, calculates a vehicle-to-vehicle distance Lt with the rear vehicle on the basis of the obtained information, and compares the vehicle-to-vehicle distance Lt with the second threshold L2. With the vehicle-to-vehicle distance Lt equal to or more than the second threshold L2, the process returns to S502. With the vehicle-to-vehicle distance Lt shorter than the second threshold L2, it is settled that a possibility of the rear vehicle not detecting one's own vehicle is high, and the process proceeds to S505. Setting the second threshold L2 to a distance shorter than the first threshold L1, for example, second threshold L2=first threshold L1×80% can determine whether the rear vehicle further approaches to.

At S505, the ECU 11, here the detection state determining unit 38 determines that the rear vehicle does not detect one's own vehicle.

At S506, the ECU 11 determines whether the turn-signal lamp SW has been turned on or not. Specifically, the ECU 11 made the determination through the course change signal detector 39 detecting turning on the turn-signal lamp SW. With the turn-signal lamp SW turned on, the course change signal detector 39 transmits the information that the turn-signal lamp SW has been turned onto the detection state determining unit 38, the ECU 11 causes the turn-signal lamp to blink, and the process proceeds to S507.

At S507, the ECU 11 transmits the vehicle's own information to the rear vehicle. Specifically, the vehicle's own information transmitting unit 40 creates the vehicle's own information and transmits the created vehicle's own information via the vehicle-to-vehicle communication device 14. The vehicle's own information contains the identification information, the location information, and the driving information on the vehicle. The location information is the current location information of one's own vehicle detected by the vehicle's own position detector 35. The driving information contains course change information and further contains information indicative of the manual driving. Accordingly, when the rear vehicle receives the transmitted vehicle's own information, the presence of a forward vehicle and the course change of the vehicle can be recognized. Since the vehicle-to-vehicle communication device 14 is omnidirectional, the vehicle's own information is transmitted also to ones other than the rear vehicles. However, as long as the rear vehicle can receive the vehicle's own information, the vehicle-to-vehicle communication device 14 may be directional.

At S508, the ECU 11 determines whether the rear vehicle has also changed the course to the identical lane or not. Specifically, the rear vehicle detector 33 obtains the reflection information from the milliwave radar 13 and determines whether the rear vehicle has changed the course to the identical lane or not on the basis of the obtained information. When the rear vehicle has also changed the course, the process proceeds to S509. When the rear vehicle does not change the course, the process returns to the flowchart in FIG. 4. With the case of the rear vehicles being two, to perform the control regarding the second rear vehicle, the process proceeds to S409 (the flowchart in FIG. 6).

At S509, the ECU 11 determines whether the vehicle-to-vehicle distance with the rear vehicle after the course change is the predetermined distance, here, shorter than the first threshold L1 or not. Specifically, the vehicle-to-vehicle distance calculator 36 obtains the reflection information from the milliwave radar 13 via the rear vehicle detector 33, calculates a vehicle-to-vehicle distance Lsb with the rear vehicle on the basis of the obtained information, and compares the vehicle-to-vehicle distance Lsb with the first threshold L1. With the vehicle-to-vehicle distance Lsb equal to or more than the first threshold L1, the process proceeds to S510. With the vehicle-to-vehicle distance Lsb shorter than the first threshold L1, since a possibility that the rear vehicle does not detect one's own vehicle is high, the process proceeds to S511.

At S510, the ECU 11, here the detection state determining unit 38 determines that the rear vehicle detects one's own vehicle and returns the process to the flowchart in FIG. 4. With the two rear vehicles, to perform the control regarding the second rear vehicle, the process proceeds to S409 (the flowchart in FIG. 6).

At S511, the ECU 11, here the detection state determining unit 38 determines that the rear vehicle does not detect one's own vehicle.

At S512, the ECU 11 transmits the second vehicle's own information to the rear vehicle. Specifically, the vehicle's own information transmitting unit 40 creates the vehicle's own information and transmits the created vehicle's own information via the vehicle-to-vehicle communication device 14. At this time, the location information is the current location information of one's own vehicle detected by the vehicle's own position detector 35. The driving information contains the information indicative of the manual driving. In this manner, the reason that the second vehicle's own information is transmitted is that the above-described transmission of the first vehicle's own information at S507 fails due to some sort of cause and therefore a possibility of the rear vehicle not detecting one's own vehicle is high.

After that, the process returns to the flowchart in FIG. 4, and the above-described processes are repeated.

The following gives a description with reference to the flowchart in FIG. 6. The flowchart in FIG. 6 illustrates a control regarding the second rear vehicle in the case where the rear vehicles are two (S409).

At S601, the ECU 11 determines whether the second rear vehicle is in the automatic driving or not. Whether the second rear vehicle is in the automatic driving or not can be determined by the method similar to the above-described method at S501. That is, the vehicle-to-vehicle distance calculator 36 obtains the reflection information from the milliwave radar 13 via the rear vehicle detector 33 and calculates the vehicle-to-vehicle distance with the (second) rear vehicle on the basis of the obtained information. Next, the autonomous vehicle information detector 37 identifies the vehicle information containing the location information indicative of being away from the position of one's own vehicle by the vehicle-to-vehicle distance calculated by the vehicle-to-vehicle distance calculator 36 as the vehicle information received from the second rear vehicle among the vehicle information received via the vehicle-to-vehicle communication device 14 from the plurality of vehicles travelling around one's own vehicle. In the case where the driving information contained in the identified vehicle information contains information indicative of the automatic driving, the autonomous vehicle information detector 37 determines that the rear vehicle is in the automatic driving. When the second rear vehicle is in the automatic driving, the process proceeds to S602. When the second rear vehicle is not in the automatic driving, it is considered that the driver can immediately check the condition when the one's own vehicle can be visually checked, the process returns to the flowchart in FIG. 4.

Next, at S602, the ECU 11, here the detection state determining unit 38 determines that the second rear vehicle does not detect one's own vehicle. Here, since the first rear vehicle obstructs one's own vehicle, the detection state determining unit 38 immediately determines that the second rear vehicle does not detect one's own vehicle.

At S603, the ECU 11 determines whether the vehicle-to-vehicle distance between the first rear vehicle and the second rear vehicle is the predetermined threshold, here, shorter than the first threshold L1 or not. Specifically, the vehicle-to-vehicle distance calculator 36 obtains the reflection information from the milliwave radar 13 via the rear vehicle detector 33, calculates a vehicle-to-vehicle distance Lbc between the first vehicle and the second vehicle on the basis of the obtained information, and compares the vehicle-to-vehicle distance Lbc with the first threshold L1. With the vehicle-to-vehicle distance Lbc equal to or more than the first threshold L1, the process proceeds to S604. With the vehicle-to-vehicle distance Lbc shorter than the first threshold L1, the process proceeds to S605.

At S604, the ECU 11, here the detection state determining unit 38 determines that the second rear vehicle does not overtake the first rear vehicle, and the process returns to the flowchart in FIG. 4.

At S605, the ECU 11 determines whether the vehicle-to-vehicle distance between the first rear vehicle and the second rear vehicle is the predetermined distance, here, shorter than the second threshold L2 or not. Specifically, the vehicle-to-vehicle distance calculator 36 again obtains the reflection information from the milliwave radar 13 via the rear vehicle detector 33 after the elapse of the predetermined time, calculates a vehicle-to-vehicle distance Ltbc between the first rear vehicle and the second rear vehicle on the basis of the obtained information, and compares the vehicle-to-vehicle distance Ltbc with the second threshold L2. With the vehicle-to-vehicle distance Ltbc equal to or more than the second threshold L2, the process returns to S603. With the vehicle-to-vehicle distance Ltbc shorter than the second threshold L2, it is settled that a possibility of the second rear vehicle overtaking the first rear vehicle is high, and the process proceeds to S606.

At S606, the ECU 11, here the detection state determining unit 38 determines that the second rear vehicle overtakes the first rear vehicle.

At S607, the ECU 11 determines whether the turn-signal lamp SW has been turned on or not. This process is a process similar to S506. With the turn-signal lamp SW turned on, the course change signal detector 39 transmits the information that the turn-signal lamp SW has been turned on to the detection state determining unit 38, and the ECU 11 causes the turn-signal lamp to blink and the process proceeds to S608.

At S608, the ECU 11 transmits the vehicle's own information to the second rear vehicle. Specifically, the vehicle's own information transmitting unit 40 creates the vehicle's own information and transmits the created vehicle's own information via the vehicle-to-vehicle communication device 14. The vehicle's own information contains the identification information, the location information, and the driving information on the vehicle. The location information is the current location information of one's own vehicle detected by the vehicle's own position detector 35. The driving information contains the course change information and further contains the information indicative of the manual driving. Accordingly, when the second rear vehicle receives the transmitted vehicle's own information, the presence of a forward vehicle and the course change of the vehicle can be recognized. Since the vehicle-to-vehicle communication device 14 is omnidirectional, the vehicle's own information is transmitted also to one other than the rear vehicle. However, as long as the second rear vehicle can receive the vehicle's own information, the vehicle-to-vehicle communication device 14 may be directional.

At S609, the ECU 11 determines whether the second rear vehicle has also changed the course to the identical lane or not. Specifically, the rear vehicle detector 33 obtains the reflection information from the milliwave radar 13 and determines whether the second rear vehicle has changed the course to the identical lane or not on the basis of the obtained information. When the second rear vehicle has also changed the course, the process proceeds to S610. When the second rear vehicle does not change the course, the process returns to the flowchart in FIG. 4.

At S610, the ECU 11 determines whether the vehicle-to-vehicle distance with the second rear vehicle after the course change is the predetermined distance, here, shorter than the first threshold L1 or not. After the course change, the second rear vehicle transitions to a rear vehicle travelling immediately rearward of one's own vehicle. However, for ease of understanding, the following designates the rear vehicle as the second rear vehicle.

The vehicle-to-vehicle distance calculator 36 obtains the reflection information from the milliwave radar 13 via the rear vehicle detector 33, calculates a vehicle-to-vehicle distance Lsc with the second rear vehicle on the basis of the obtained information, and compares the vehicle-to-vehicle distance Lsc with the first threshold L1. With the vehicle-to-vehicle distance Lsc equal to or more than the first threshold L1, the process proceeds to S611. With the vehicle-to-vehicle distance Lsc shorter than the first threshold L1, since a possibility that the second rear vehicle does not detect one's own vehicle is high, the process proceeds to S612.

At S611, the ECU 11, here the detection state determining unit 38 determines that the second rear vehicle detects one's own vehicle and returns the process to the flowchart in FIG. 4.

At S612, the ECU 11, here the detection state determining unit 38 determines that the second rear vehicle does not detect one's own vehicle.

At S613, the ECU 11 transmits the second vehicle's own information to the second rear vehicle. Specifically, the vehicle's own information transmitting unit 40 creates the vehicle's own information and transmits the created vehicle's own information via the vehicle-to-vehicle communication device 14. At this time, the location information is the current location information of one's own vehicle detected by the vehicle's own position detector 35. The driving information contains the information indicative of the manual driving. In this manner, the reason that the second vehicle's own information is transmitted is that the above-described transmission of the first vehicle's own information at S608 fails due to some sort of cause and therefore a possibility of the second rear vehicle not detecting one's own vehicle is high.

After that, the process returns to the flowchart in FIG. 4, and the above-described processes are repeated.

In this manner, with this embodiment, when it is determined that the rear vehicle as the autonomous vehicle does not detect one's own vehicle, the vehicle's own information is transmitted to the rear vehicle immediately before one's own vehicle changes the course. Accordingly, even if the rear vehicle as the autonomous vehicle does not detect one's own vehicle, the transmission of the vehicle's own information to cause the rear vehicle to recognize one's own vehicle allows preventing an accident such as a contact and a rear-end collision. Thus, determining the state of the rear vehicle by one's own vehicle ensures the preventive safety.

Especially, in the case where the rear vehicle does not detect one's own vehicle, the accident possibly occurs. Therefore, the determination whether the rear vehicle has detected one's own vehicle or not by one's own vehicle ensures the preventive safety further. At this time, the transmission of the vehicle's own information containing the location information and the course change information of one's own vehicle ensures causing the autonomous vehicle to recognize the presence of the forward vehicle, thereby allowing the prevention of the accident as the contact and the rear-end collision.

In the above-described embodiment, when the first rear vehicle is the autonomous vehicle, it is determined that the first rear vehicle detects one's own vehicle. When the second rear vehicle is the autonomous vehicle, the vehicle's own information is transmitted to the second rear vehicle immediately before one's own vehicle changes the course. Accordingly, when the second rear vehicle is the autonomous vehicle, it is assumed that one's own vehicle is not detected and the vehicle's own information is transmitted to cause the second rear vehicle to recognize one's own vehicle, thus ensuring the prevention of the accident such as the contact and the rear-end collision.

Although a spread of the vehicle-to-vehicle communication devices transmits/receives many pieces of the vehicle information, the transmission of the vehicle's own information only when it is determined that the rear vehicle does not detect one's own vehicle ensures restraining transmission of unnecessary information to the autonomous vehicle. That is, this allows the reduction in processes performed by the autonomous vehicle on the transmitted information.

In the case where the condition of the rear vehicle is detected after the course change and there is a high possibility that one's own vehicle is not still detected, the second vehicle's own information is transmitted. This ensures the prevention of the accident such as the contact and the rear-end collision with more certainty.

The use of the milliwave radar 13 for detection of the rear vehicle can detect the rear vehicle even under the detection environment conditions such as rain and a fog.

Although the above-described embodiment uses the vehicle-to-vehicle distance with the rear vehicle as a parameter for the determination on the possibility of undetected one's own vehicle, a velocity or an acceleration may be used as the parameter.

The small-sized vehicle as a so-called saddle-ride type vehicle makes it more difficult for the rear vehicle to detect the small-sized vehicle. Accordingly, providing the prevention safety device 10 according to the embodiment to the saddle-ride type vehicle allows enhancing the effect of preventive safety. The saddle-ride type vehicle is not limited to the motorcycle but may be a three-wheeler with two front wheels or with two rear wheels.

While the present invention has been described with the various embodiments, the present invention is not limited only to these embodiments. Changes and similar modification are possible within the scope of the present invention.

The above-described embodiment describes the case where the vehicle's own information is transmitted when the rear autonomous vehicle on the lane where one's own vehicle travels does not detect one's own vehicle; however, this should not be construed in a limiting sense. That is, the flowcharts in FIG. 5 and FIG. 6 may be executed on the rear autonomous vehicle on the lane for course change.

The above-described embodiment describes the case where one's own vehicle changes the course; however, this should not be construed in a limiting sense. That is, in addition to the course change, in the case where the rear autonomous vehicle does not detect one's own vehicle, the similar control may be applied to transmit the vehicle's own information.

The above-described embodiment describes the case where the second rear vehicle is detected; however, this should not be construed in a limiting sense. The use of a rear vehicle detection device with wide detection range may detect third and later rear vehicles. In this case, processes similar to the above-described control regarding the second rear vehicle can also be performed on the third and later rear vehicles.

The present invention can reduce the risk possibly occurring in the small-sized vehicle that travels in front of the autonomous vehicle.

What is claimed is:

1. A prevention safety device in course change of small-sized vehicle, comprising:
   a rear vehicle detection unit configured to detect a rear vehicle travelling at a rear of one's own vehicle;
   a determining unit configured to determine whether the rear vehicle detects one's own vehicle or not when the rear vehicle detected by the rear vehicle detection unit is an autonomous vehicle; and
   a transmitting unit configured to transmit vehicle's own information to the rear vehicle immediately before one's own vehicle changes a course when the determining unit determines that the rear vehicle does not detect one's own vehicle, wherein:
   the rear vehicle detection unit is configured to detect whether a target rear vehicle to which the vehicle's own information is transmitted by the transmitting unit has changed a course to a lane identical to one's own vehicle or not, and
   when the determining unit determines that the target rear vehicle has changed the course to the lane identical to one's own vehicle and determines that the target rear vehicle does not detect one's own vehicle, the transmitting unit is configured to transmit second vehicle's own information to the target rear vehicle.

2. A prevention safety device in course change of small-sized vehicle, comprising:
   a rear vehicle detection unit configured to detect a rear vehicle travelling at a rear of one's own vehicle;
   a transmitting unit configured to transmit vehicle's own information to a second rear vehicle immediately before one's own vehicle changes a course when the second rear vehicle detected by the rear vehicle detection unit is an autonomous vehicle; and
   a determining unit configured to determine whether the second rear vehicle detected by the rear vehicle detection unit detects one's own vehicle, wherein:
   the rear vehicle detection unit is configured to detect whether the second rear vehicle to which the vehicle's own information is transmitted by the transmitting unit has changed a course to a lane identical to one's own vehicle or not, and
   when the determining unit determines that the second rear vehicle has changed the course to the lane identical to one's own vehicle and determines that the second rear vehicle does not detect one's own vehicle, the transmitting unit is configured to transmit second vehicle's own information to the second rear vehicle.

3. The prevention safety device in course change of small-sized vehicle according to claim 1, wherein the rear vehicle detection unit is configured to detect the rear vehicle on the basis of information detected by a milliwave radar.

4. The prevention safety device in course change of small-sized vehicle according to claim 1, wherein the small-sized vehicle is a saddle-ride type vehicle.

5. The prevention safety device in course change of small-sized vehicle according to claim 2, wherein the rear vehicle detection unit is configured to detect the rear vehicle on the basis of information detected by a milliwave radar.

6. The prevention safety device in course change of small-sized vehicle according to claim 2, wherein the small-sized vehicle is a saddle-ride type vehicle.

7. The prevention safety device in course change of small-sized vehicle according to claim 1, wherein the determining unit is configured to determine whether the rear vehicle detects one's own vehicle or not on the basis of a vehicle-to-vehicle distance with the rear vehicle.

8. The prevention safety device in course change of small-sized vehicle according to claim 7, wherein the determining unit is configured to determine that the rear vehicle does not detect one's own vehicle when the vehicle-to-vehicle distance with the rear vehicle is shorter than a predetermined distance.

9. The prevention safety device in course change of small-sized vehicle according to claim 1, further comprising an autonomous vehicle determining unit configured to determine whether a vehicle is the autonomous vehicle or not on the basis of vehicle information received from the rear vehicle or a position lamp for automatic driving mode of the rear vehicle.

10. The prevention safety device in course change of small-sized vehicle according to claim 1, wherein the vehicle's own information includes identification information of a vehicle and location information of one's own vehicle.

11. The prevention safety device in course change of small-sized vehicle according to claim 2, wherein the determining unit is configured to determine whether the second rear vehicle detects one's own vehicle or not on the basis of a vehicle-to-vehicle distance with the second rear vehicle.

12. The prevention safety device in course change of small-sized vehicle according to claim 11, wherein the determining unit is configured to determine that the second rear vehicle does not detect one's own vehicle when the vehicle-to-vehicle distance with the second rear vehicle is shorter than a predetermined distance.

13. The prevention safety device in course change of small-sized vehicle according to claim 2, further comprising an autonomous vehicle determining unit configured to determine whether a vehicle is the autonomous vehicle or not on the basis of vehicle information received from the second rear vehicle or a position lamp for automatic driving mode of the second rear vehicle.

14. The prevention safety device in course change of small-sized vehicle according to claim 2, wherein the vehicle's own information includes identification information of a vehicle and location information of one's own vehicle.

* * * * *